United States Patent
Walsh, Jr. et al.

[11] Patent Number: 5,881,996
[45] Date of Patent: Mar. 16, 1999

[54] VALVE PLUG

[75] Inventors: Richard D. Walsh, Jr., Birmingham; Joe M. Sims, Columbiana; Buck M. Rutherford, Remlap, all of Ala.

[73] Assignee: Stockham Valves & Fittings, Inc., Birmingham, Ala.

[21] Appl. No.: 520,255

[22] Filed: Aug. 28, 1995

[51] Int. Cl.⁶ .................................................... F16K 5/02
[52] U.S. Cl. ..................................... 251/309; 251/315.16
[58] Field of Search .............................. 251/309, 315.08, 251/315.16

[56] References Cited

U.S. PATENT DOCUMENTS

| | | |
|---|---|---|
| 2,045,113 | 6/1936 | Ward . |
| 3,323,537 | 6/1967 | Shafer ............................ 251/315.08 X |
| 3,784,155 | 1/1974 | Tomlin ........................... 251/315.16 X |
| 4,450,854 | 5/1984 | Alexander et al. . |
| 4,512,360 | 4/1985 | Chronister ......................... 251/309 X |
| 4,753,418 | 6/1988 | Brotcke . |
| 4,989,631 | 2/1991 | Harbin . |
| 5,333,834 | 8/1994 | Soderberg . |
| 5,338,002 | 8/1994 | McNaughton et al. . |

FOREIGN PATENT DOCUMENTS

| | | | |
|---|---|---|---|
| 0067334 | 12/1982 | European Pat. Off. ............... | 251/309 |
| 0195972 | 12/1982 | Japan .................................. | 251/309 |

OTHER PUBLICATIONS

Excerpt from ROTOVALVE catalog entitled "Chicago Deep Tunnel".

*Primary Examiner*—John C. Fox

[57] ABSTRACT

A valve plug in which excess metal has been removed, leaving only the necessary surfaces for providing sealing and a flow passage. The invention abandons the truncated cone shape of the prior art for a non-conical shape; the only portions of the plug which extend toward the surface of the valve body are those necessary to provide sealing contact. The plug uses a pipe-shaped flow conduit having a cross-sectional dimension to match the size of the valve body seat around the flow ports in the valve body. The flow conduit has walls of substantially uniform thickness, such that the exterior surface of the conduit is spaced from the interior surface of the valve body, except at the ends of the conduit. In two embodiments, arcuate plates extend laterally from the sides of the flow conduit; the plates prevent the passage of fluid through the valve body when rotated into position adjacent the flow ports. A cavity is defined between the plates and the exterior surface of the flow conduit. In another embodiment, pipe-like sealing extensions are affixed to the sides of the flow conduit. The ends of the extensions mate with the valve body seat around the flow port when the valve plug is in the closed position. In this embodiment, the exterior surface of the flow conduit and the interior surface of the sealing extensions form the sealing surfaces which prevent the passage of fluid through the valve body.

9 Claims, 6 Drawing Sheets

VALVE PLUG

FIELD OF THE INVENTION

The present invention relates to valve plugs. More particularly, the present invention relates to lift-type, non-lubricated plug valves. Still more particularly, the present invention relates to a lighter weight valve plug in which excess metal has been eliminated, reducing its cost and improving its function.

BACKGROUND OF THE INVENTION

Lift-type non-lubricated plug valves are well-known in the art and are used in a variety of industries, including petroleum refining, chemical process and pulp and paper mills. The plugs currently in use are typically in the shape of a truncated cone with a flow passage through the center, as shown in FIG. 1. While these plugs perform well, they suffer some disadvantages. Plug valves are manufactured in a wide range of sizes, typically from about ½" to about 36". For special applications, the valves are manufactured in even larger sizes. A steel valve plug for a 24" valve weighs about 5,300 pounds. The high weight of the larger plugs make them difficult to handle, both during the manufacturing process and after they are placed in service. The valves are typically opened and closed by lifting the plug from the valve body, rotating the plug, and re-seating it within the body. The weight of the plugs places a high demand on the equipment used to actuate the valve. Additionally, due to the varying thickness of the wall surrounding the flow channel, casting shrinkage problems occur during manufacturing. Also because of the thickness of the walls, the seating surface of the plug has no flexibility. Further, since any portion of the exterior surface of the plug may engage the valve body seat, the entire exterior surface of the plug must be precision machined to provide the tight tolerances required for efficient operation of the valve. Some applications, such as those involving high temperature corrosive steam and oil, require hard-surfacing of the seating surfaces on both the valve plug and the valve body. Hard-surfacing involves depositing a facing on the seating surfaces of the valve plug and the valve body, then precision machining the facing. The seating surfaces on the present plugs are not well-defined, therefore requiring hard-surfacing of a larger area of the plug surface to ensure that the seating surface is properly treated.

SUMMARY OF THE PRESENT INVENTION

With the foregoing in mind, the principal object of the present invention is to provide a valve plug which is of lighter weight than the present plugs, thereby reducing material and shipping costs, and increasing the ease of manufacture and use of the plug without sacrificing in terms of function.

Another object of the present invention is to provide a valve plug which is configured such that it reduces shrinkage problems in casting.

Yet another object of the invention is to provide a valve plug with defined seating surfaces for machining and hard-surfacing.

Another object of the invention is to provide a valve plug with less sticking tendency.

Another object of the invention is to provide a valve plug with increased seat flexibility for improved sealing.

These and other objects of the present invention are accomplished through the use of a valve plug design in which the excess metal has been removed, leaving only the necessary surfaces for providing sealing and a flow passage. The valve plug of the present invention abandons the truncated cone shape of the prior art for a non-conical shape in which the only portions of the plug which extend outwardly toward the interior surface of the valve body are those that are necessary to provide sealing contact with the valve seat around the flow port. The new valve plug uses a flow conduit which is in the form of a pipe having a cross-sectional dimension to match the size of the valve body seat around the flow ports in the valve body. The flow conduit has walls of substantially uniform thickness, such that the exterior surface of the conduit is spaced from the valve body seats when the plug is rotated to the closed position. In two embodiments of the plug, arcuate plates are connected to and extend laterally from the sides of the flow conduit, forming a sealing surface which prevents the passage of fluid through the valve body when the plates are rotated into position adjacent the flow ports. A cavity is defined between the arcuate plates and the exterior surface of the flow conduit. In an alternate embodiment of the valve plug, pipe-like sealing extensions are affixed to the sides of the flow conduit. The ends of the extensions mate with the valve body seat around the flow port when the valve plug is in the closed position. In the alternate embodiment, the exterior surface of the flow conduit forms the sealing surface which prevents the passage of fluid through the valve body.

BRIEF DESCRIPTION OF THE DRAWINGS

The foregoing objects and advantages of the present invention for an improved valve plug will be more readily understood by one skilled in the art by referring to the following detailed description of the invention and to the accompanying drawings which form a part of this disclosure, and wherein.

DETAILED DESCRIPTION OF THE INVENTION

Figure 1:
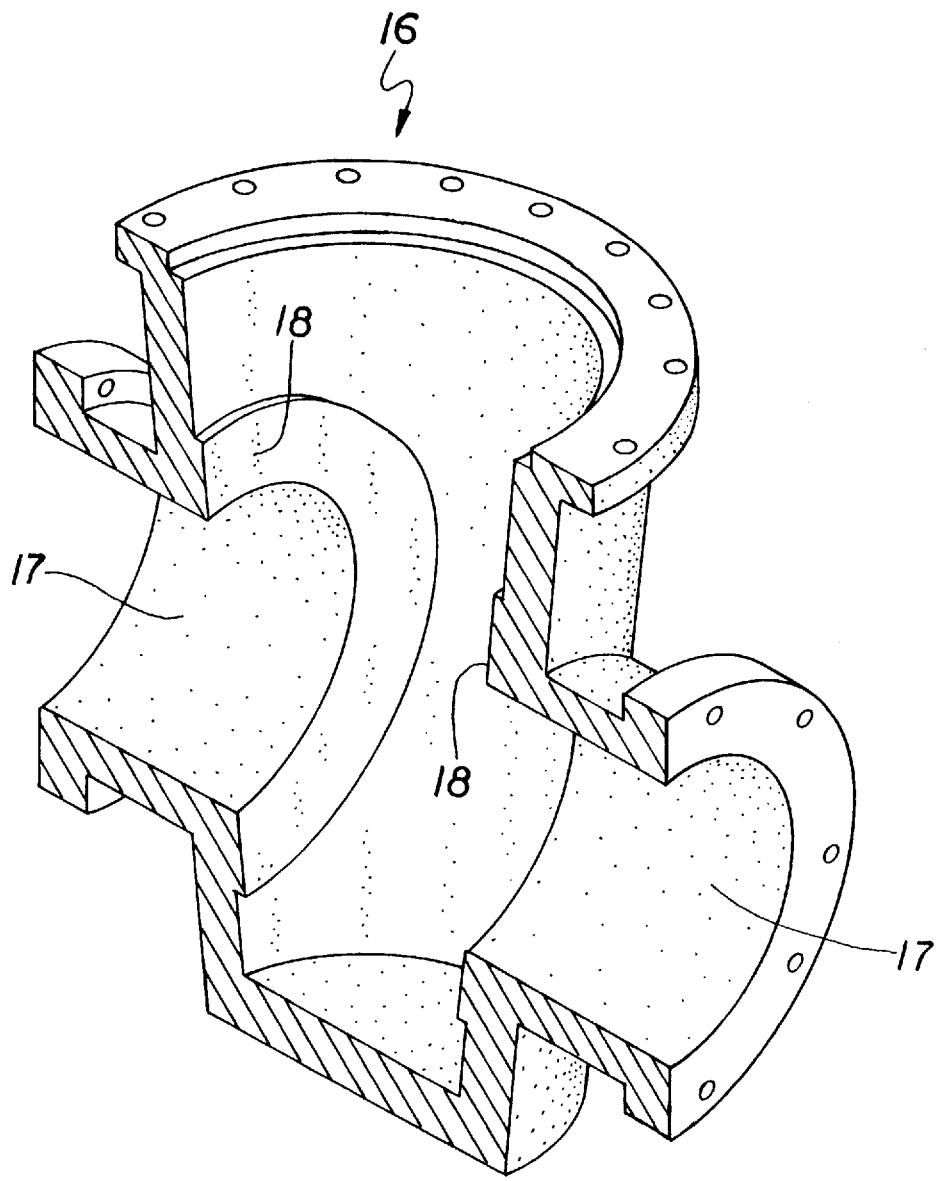
FIG. 1 is a perspective view of a valve body partially broken away and in section to reveal interior surfaces.

FIG. 1 depicts the valve body 16 into which the plug of the present invention is to be seated. The valve body 16 has a plurality of flow ports 17 defined in its interior surface. The valve body seat 18 against which the plug seats is the portion of the interior surface circumscribing the flow ports 17 in the valve body 16. The valve body seats 18 may be, but are not necessarily, a raised surface.

Figure 3:
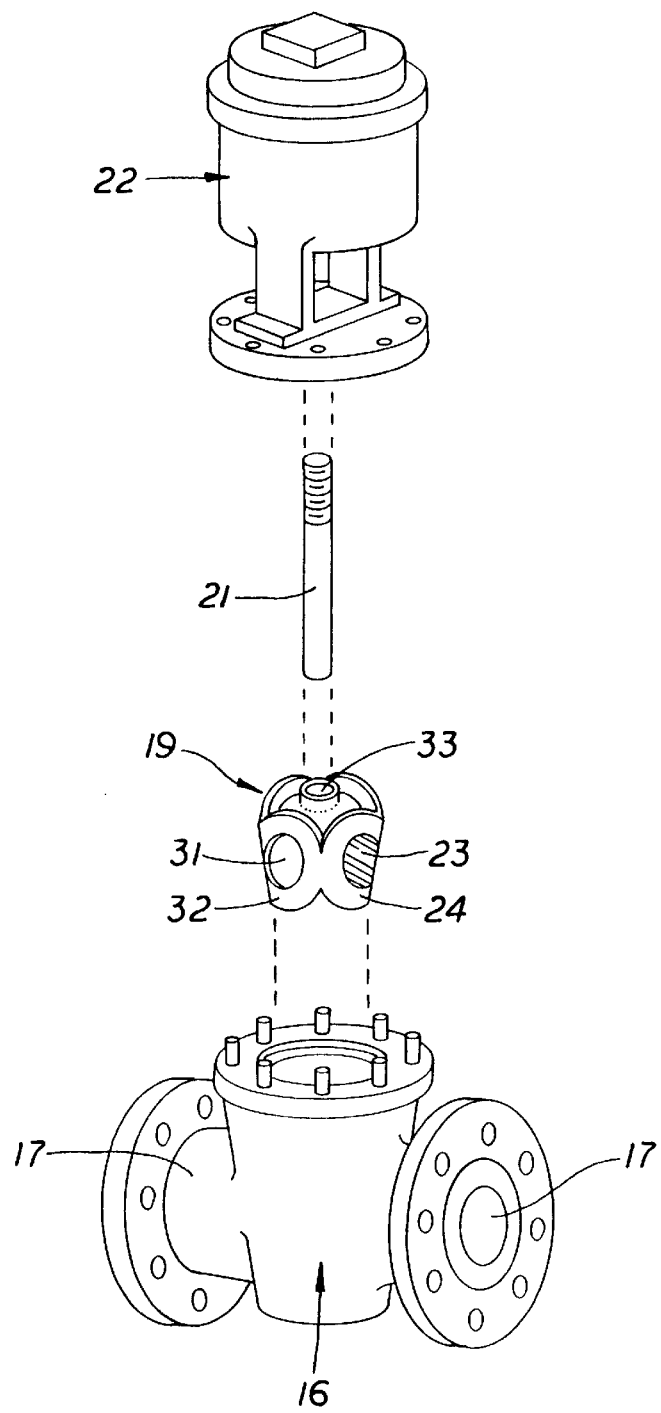
FIG. 3 is an exploded perspective view of the valve plug of the present invention, shown in relation to the valve body, the stem, and the housing for the actuating mechanism.
Figure 4:
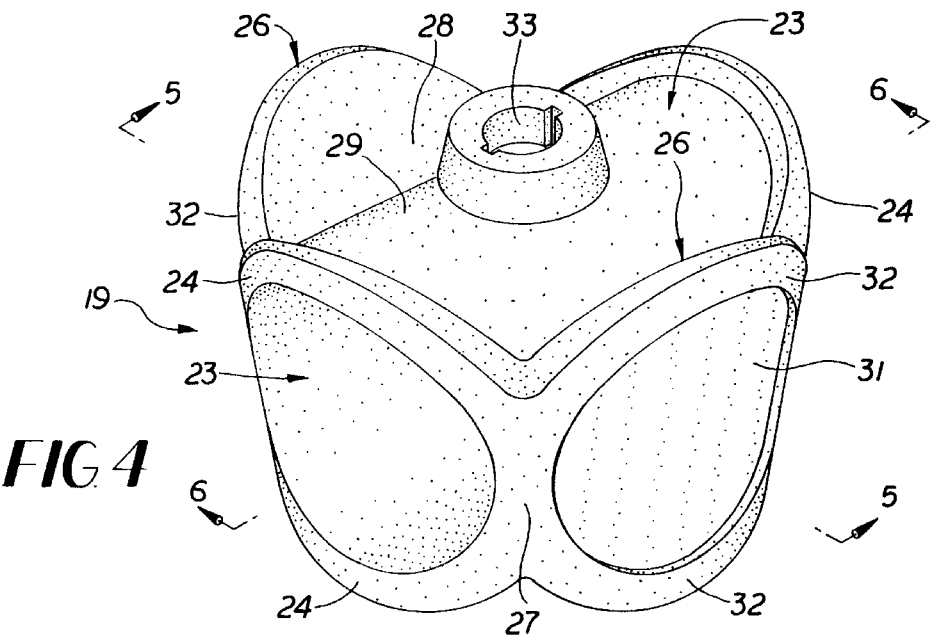
FIG. 4 is a perspective view of the valve plug of the present invention.
Figures 5, 6:
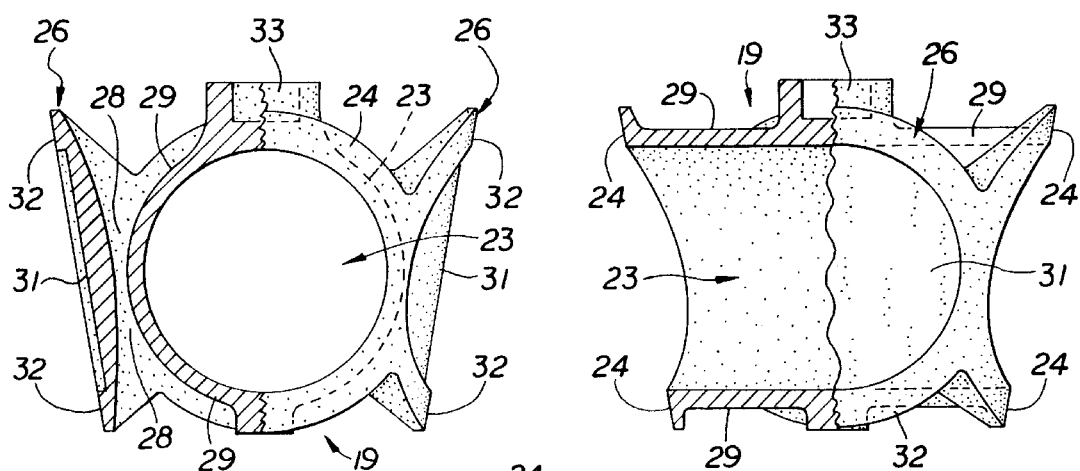
FIG. 5 is a front elevational view, partially in section, of the valve plug of the present invention, taken along line 5—5 of FIG. 4.
FIG. 6 is a side elevational view, partially in section, of the valve plug of the present invention, taken along line 6—6 of FIG. 4.
Figure 7:
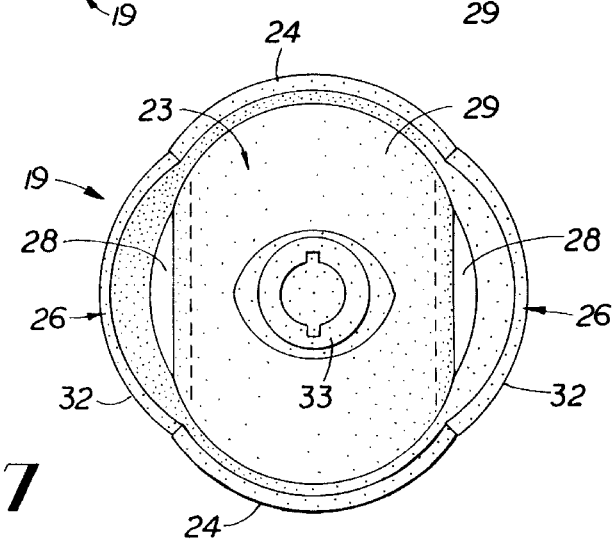
FIG. 7 is a top view of the valve plug of the present invention.
Figure 8:
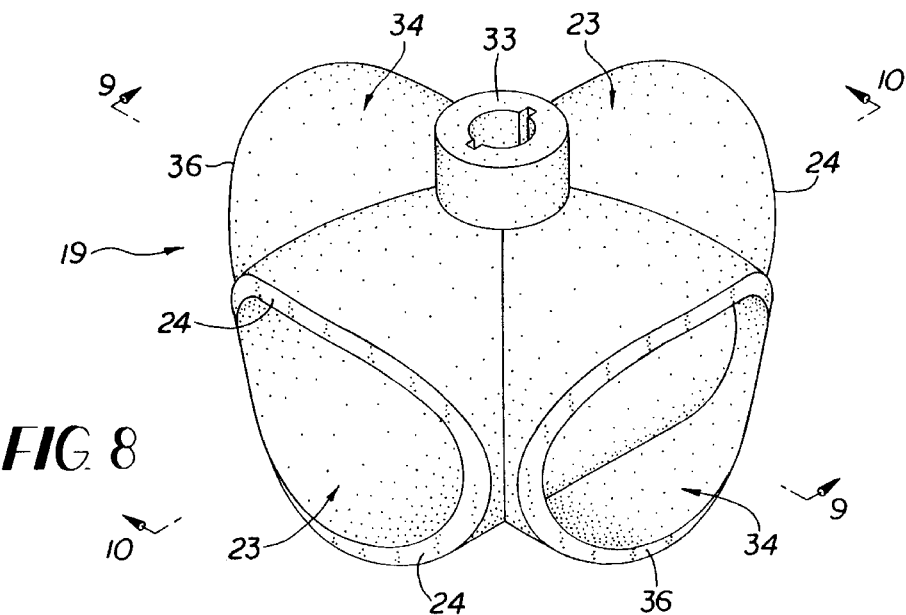
FIG. 8 is a perspective view of an alternate embodiment of the valve plug of the present invention.
Figures 9, 10:
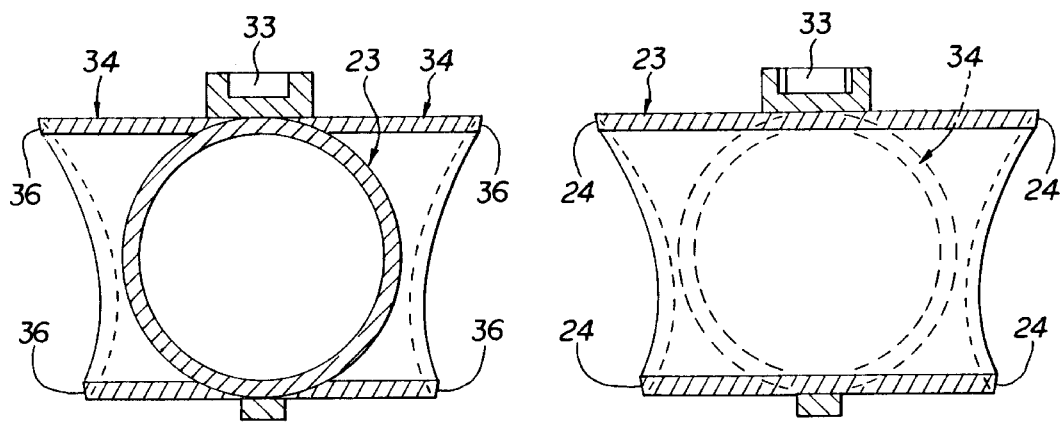
FIG. 9 is a sectional view of the alternate embodiment of the valve plug, taken along line 8—8 of FIG. 7.
FIG. 10 is a sectional view of the alternate embodiment of the valve plug, taken along line 9—9 of FIG. 7.
Figure 11:
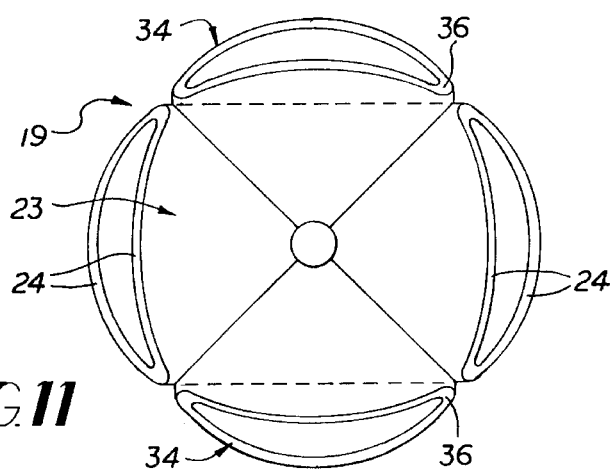
FIG. 11 is a bottom view of the alternate embodiment of the valve plug.
Figure 12:
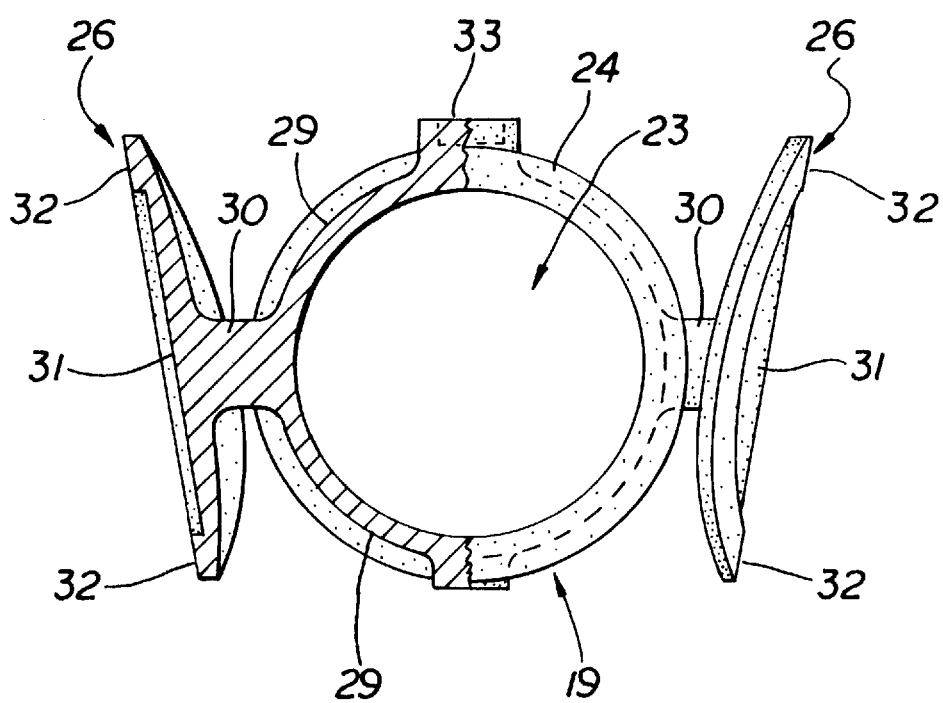
FIG. 12 is a side elevational view, partially in section, of an alternate embodiment of the valve plug.

FIG. 3 shows the plug 19 of the present invention, a valve body 16, a valve stem 21 and a housing 22 for the valve actuating mechanism. As shown in FIGS. 4 through 7, the valve plug 19 includes a flow conduit 23 for fluid passing between flow ports in the valve body 16. The ends of the flow conduit 23 are circumscribed by seating surfaces 24. The seating surfaces 24 may form a rim on the ends of the flow conduit 23. Arcuate plates 26 are positioned laterally of the flow conduit 23, and have side edges 27 which are connected to the ends of the flow conduit 23. Alternatively, as seen in FIG. 12, the arcuate plates 26 may be attached to the exterior surface of the flow conduit 23, not at side edges of the plate, but by an extension 30 affixed to the surface of the plate facing the conduit, and extending from the plate surface to the exterior surface 29 of the flow conduit 23. The plates 26 are connected such that cavities 28 are defined between the exterior surface 29 of the flow conduit 23 and the plates 26. The plates 26 each include a sealing surface 31 which prevents the passage of fluid through the valve body 16 when the valve plug 19 is rotated to the closed position with the sealing surface 31 aligned with the flow port 17 in the valve body 16. The sealing surface 31 is circumscribed by a raised seating rim 32, which is engageable with the valve body seat 18. The plug 19 includes a stem receptacle 33 for attaching the plug 19 to the valve stem 21.

An alternate embodiment of the valve plug is shown in FIGS. 8 through 11. This embodiment also includes a flow conduit 23, with seating surfaces 24 defined on the ends of the flow conduit 23. Seating extensions 34 are affixed to and extend laterally from the sides of the flow conduit 23. The seating extensions 34 are pipe-like members having the same cross-sectional dimension as the flow conduit 23. Seating edges 36 are defined on the ends of the seating extensions 34. The seating edges 36 are dimensioned to mate with the valve body seat 18 circumscribing the flow port 17 in the valve body 16.

Figure 2:
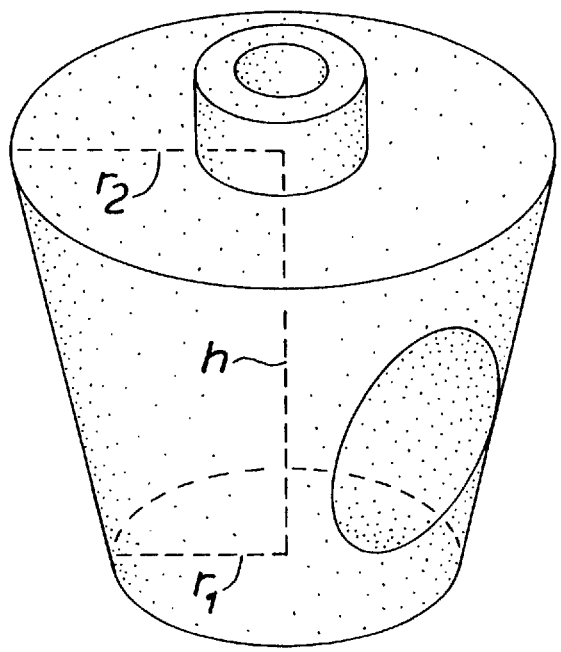
FIG. 2 is a perspective view of a prior art valve plug.

The wedge plugs of the prior art essentially were in the shape of a frustrum of a right circular cone, with a passageway defined through the plug body. (See FIG. 2). The volume of the prior art wedge plug would accordingly be the volume of the frustrum of the cone, less the volume of the passageway, and is defined by the formula:

$$V = \frac{1}{3}\pi h (r_1^2 + r_1 r_2 + r_2^2) - V_o$$

where h = the height of the plug body:

$r_1$ = the maximum radius of a plug body having a conic surface matable with said valve ports;

$r_2$ = the radius of a plug body at a distance h below $r_1$; and $v_o$ = the volume of the passageway defined by said conduit.

The volume of the wedge plug of the present invention is substantially less than the volume of the prior art plugs as defined above.

As is shown in the drawings, the excess metal surrounding the flow conduit in the prior art valve plugs has been removed. Since over half of the cost of a valve plug is the cost of the material, manufacturing costs are substantially reduced by use of the present invention. Additionally, the weight of the plug is reduced dramatically. As noted above, a steel valve plug for a 24" valve weighs approximately 5,300 pounds. A steel valve plug for the same size valve manufactured using the design of the present invention weighs approximately 2,850 pounds. This dramatic reduction in weight is accomplished without sacrificing the sealing capability of the valve plug and results in increased ease of handling for both the manufacturer of the plug and the user, as well as reduced shipping costs. Use of the present design also results in a reduction of casting shrinkage problems, because the relatively uniform wall thicknesses allow for more uniform cooling of the plug after casting. A further benefit of the new design is that the seating surfaces 24 circumscribing the ends of the flow conduit 23, the seating rims 32 circumscribing the sealing surfaces 31 of the arcuate plates 26, and the seating edges 36 of the seating extensions 34 provide well-defined areas for machining and hard-surfacing, which also serves to reduce the manufacturing cost. The definition of the seating areas on the plug also reduces the tendency of the plug to stick in the valve body, since the area of the plug which may contact the valve body seat is reduced. Because of the reduction in the thickness of the metal behind the seating surfaces and seating rim of the plug, the seats have a degree of increased flexibility, thereby improving the sealing capability of the valve plug.

While we have shown our invention in two embodiments, it will be obvious to those skilled in the art that the invention is not so limited, but is susceptible of various changes and modifications without departing from the spirit thereof. For example, the invention has been depicted with a flow conduit opening that is the same size, or 100 percent, of the port opening. Although not depicted in the drawings, the present invention may also be manufactured to provide for alternate ratios, such as 40 percent, 70 percent, or 90 percent of the flow port opening.

Having set forth the nature of the invention, what we claim is:

1. A valve plug for use in a valve body having a plurality of flow ports formed in said valve body said valve plug selectively movable between a flow position providing fluid communication between said plurality of ports and a closed position preventing fluid communication between said plurality of ports, said valve plug comprising:

(a) an upper end and a lower end wherein said plug generally tapers in width from said upper end toward said lower end;

(b) a conduit for providing passage of fluids between said plurality of ports, said conduit having ends disposed to align with said plurality of ports when said valve plug is in said flow position wherein each of said ends of said conduit is circumscribed by a seating surface, said conduit further having a wall, said wall being of substantially uniform thickness along substantially the length of said conduit;

(c) sealing means, affixed to said conduit in laterally offset and non-communicating relation thereto for preventing passage of fluids through at least one of said ports when said valve is in said closed position, a portion of said sealing means spaced from said conduit such that a cavity is defined intermediate said portion of said sealing means and said conduit; and (d) a valve body seat circumscribing each of said flow ports, wherein said seating surface is engageable with said valve body seat.

2. A valve plug as defined in claim 1, wherein said conduit wall further has an exterior surface, and wherein said sealing means comprises an arcuate plate rigidly connected to said conduit, such that a cavity is defined between said exterior surface of said conduit wall and said arcuate plate.

3. A valve plug as defined in claim 2, wherein said arcuate plate comprises a recessed sealing surface and a raised sealing rim circumscribing said recessed sealing surface, said raised sealing rim engageable with said valve body seat.

4. A valve plug as defined in claim 3, wherein said seating surfaces and said seating rim are annular.

5. A valve plug as defined in claim 1, wherein said seating surface comprises a flange which extends laterally from said conduit.

6. A valve plug for use in a valve body having an interior surface, a plurality of flow ports formed in said interior surface and a plurality of valve body seats, one of said plurality of valve body seats circumscribing each of said plurality of flow ports said valve plug selectively movable between a flow position providing fluid communication between said plurality of ports and a closed position preventing fluid communication between said plurality of ports, said valve plug comprising:

(a) an upper end and a lower end wherein said plug generally tapers in width from said upper end toward said lower end;

(b) a conduit for providing passage of fluids between said plurality of ports, said conduit having ends disposed to align with said plurality of ports when said valve plug is in said flow position wherein each of said ends of said conduit is circumscribed by a seating surface, said seating surface engageable with one of said plurality of valve body seats, said conduit further having an exterior surface, said exterior surface being spaced from said plurality of valve body seats when said valve plug is in said closed position; and (c) sealing means, affixed to said conduit in laterally offset and non-communicating relation thereto for preventing passage of fluids through at least one of said ports when said valve is in said closed position, a portion of said sealing means spaced from said conduit such that a cavity is defined intermediate said portion of said sealing means and said conduit.

7. A valve plug as defined in claim 6, wherein said seating surface comprises a flange which protrudes laterally from said exterior surface of said conduit.

8. A valve plug as defined in claim 6, wherein said sealing means comprises an arcuate plate having side edges, said side edges rigidly connected to said ends of said conduit such that a cavity is defined between said exterior surface of said conduit and said arcuate plate.

9. A valve plug as defined in claim 8, wherein said arcuate plate comprises a recessed sealing surface and a raised sealing rim circumscribing said recessed sealing surface, said raised sealing rim engageable with one of said plurality of valve body seats.

\* \* \* \* \*